March 23, 1948.  W. P. McDONOUGH  2,438,322
CATTLE RESTRAINING CHUTE
Filed Dec. 20, 1944  6 Sheets-Sheet 1

Inventor
William P. McDonough.

By Clarence A. O'Brien
and Harvey B. Jacobson
Attorneys

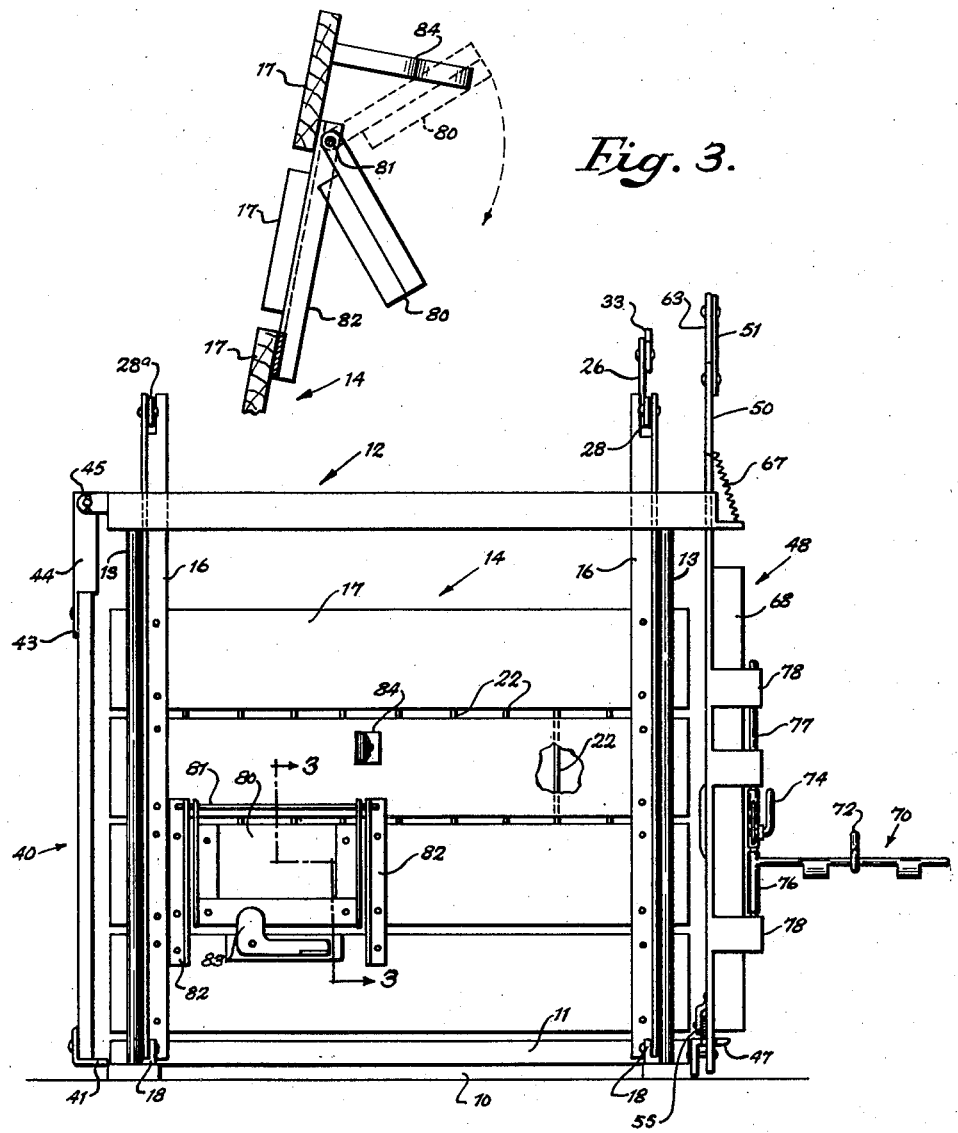

March 23, 1948.  W. P. McDONOUGH  2,438,322
CATTLE RESTRAINING CHUTE
Filed Dec. 20, 1944  6 Sheets-Sheet 3

Inventor
William P. McDonough.

By *Clarence A. O'Brien and Harvey B. Jacobson*
Attorneys

March 23, 1948.  W. P. McDONOUGH  2,438,322
CATTLE RESTRAINING CHUTE
Filed Dec. 20, 1944  6 Sheets-Sheet 4

Inventor
William P. McDonough.

By *Clarence A. O'Brien and Harvey B. Jacobson*
Attorneys

March 23, 1948. W. P. McDONOUGH 2,438,322
CATTLE RESTRAINING CHUTE
Filed Dec. 20, 1944 6 Sheets-Sheet 5

Inventor
William P. McDonough.

By Clarence A. O'Brien
and Harvey B. Jacobson
Attorneys

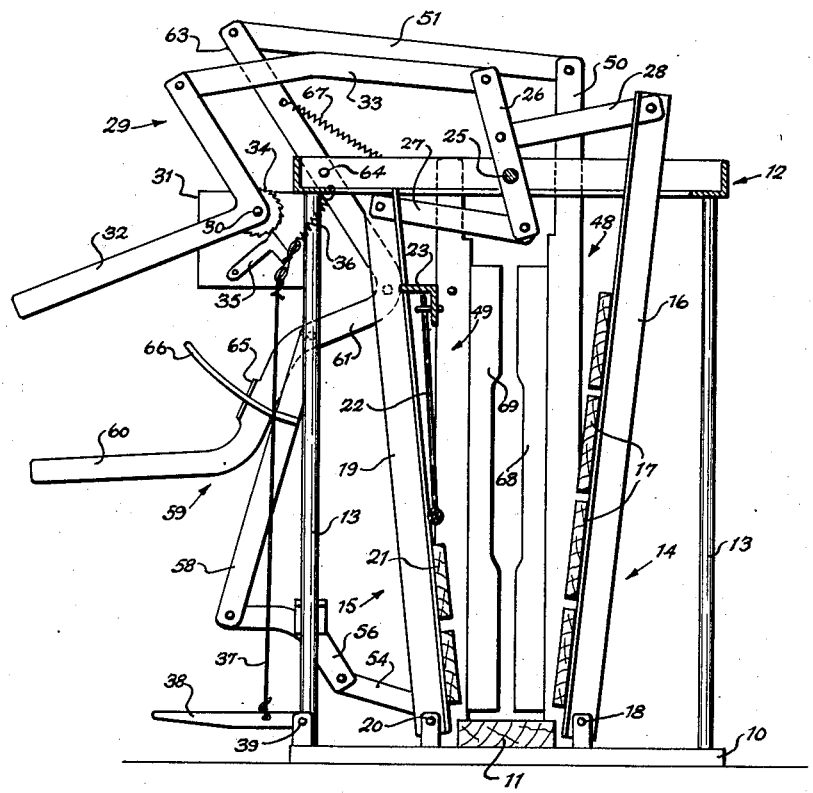

Patented Mar. 23, 1948

2,438,322

UNITED STATES PATENT OFFICE 2,438,322

CATTLE-RESTRAINING CHUTE

William P. McDonough, Gunnison, Colo., assignor to Roy Andrews, Colorado Springs, Colo.

Application December 20, 1944, Serial No. 569,015

6 Claims. (Cl. 119—99)

This invention relates to what is believed to be a structurally improved chute which is especially, but not necessarily, adapted for handling range cattle, the captive being held firmly and substantially immovable therein to expedite branding, dehorning and similar and other operations.

Needless to say, I am aware that cow and calf-accommodating and holding chutes for vaccinating, milking and the like are not broadly new. It follows, therefore, that my primary aim is the provision of a chute which is characterized by significant structural refinements, these serving, collectively speaking, in providing a chute whose overall utility renders it aptly designed and otherwise appropriate in achieving the desired ends.

Briefly and broadly speaking, the preferred embodiment of the invention is characterized by an open-type framework, this provided with a central longitudinal platform or walkway, there being a pair of opposed complemental confining walls rising from said walkway, these walls being movable toward and from each other, whereby to provide a restricted corral in which the captive is temporarily penned, as it were, thus enabling a single attendant, more or less without assistance or aid, to perform such tasks as vaccinating, dehorning, branding, and so on and so forth.

Another phase of the invention has to do with the aforementioned structure in which the so-called corral is more in the nature of an expansible and contractible stall, that is, a stall whose walls are pivotally mounted but mechanically moved toward and from each other, whereby after the calf or cow is located therebetween, mechanical toggle devices may be then brought into play to exert variable restraining pressure against the animal, this sufficient to provide the desired retentive result necessary to conform to the requirements of the attendant handling vaccinating and other similar assignments.

In addition to the open framework with the confining and restraining stall, I provide, this at one end of the structure, stanchions, these to adjustably and satisfactorily embrace the protruding neck, said stanchions having associated therewith projecting appliances for shackling the head and nose sufficiently to permit the attendant to accomplish desired dehorning without too much interference from the captive.

Another object of the invention has to do with the provision of a restraining stall construction in which one of the confining walls is provided with a so-called milking door and means for holding the door in open position, this to permit access to be had to the interior of the stall, whereby the entrapped cow, that is, a wild range cow, can be milked to preserve the bag for obvious purposes.

Another object of the invention has to do with the provision of an open-style framework encompassing the adjustable wall stall, this along with the aforementioned manually regulated, mechanically controlled stanchions, and a closing door at the entrance end of the stall, whereby to provide an assemblage in which the animal is driven into the stall, after which the door is closed to accomplish the desired enclosing and confining results.

Other features and advantages will become more readily apparent from the following description and the accompanying illustrative drawings.

In the drawings, wherein like numerals are employed to designate like elements and parts throughout the views:

Figure 2 is also a side elevational view, this of the opposite side of the chute.

Figure 3 is an enlarged fragmentary sectional view showing the milking door, this being on the plane of the line 3—3 of Figure 2, looking in the direction of the arrows.

Figure 8 is a transverse vertical sectional view taken on the plane of line 8—8 of Figure 4.

Figure 6:
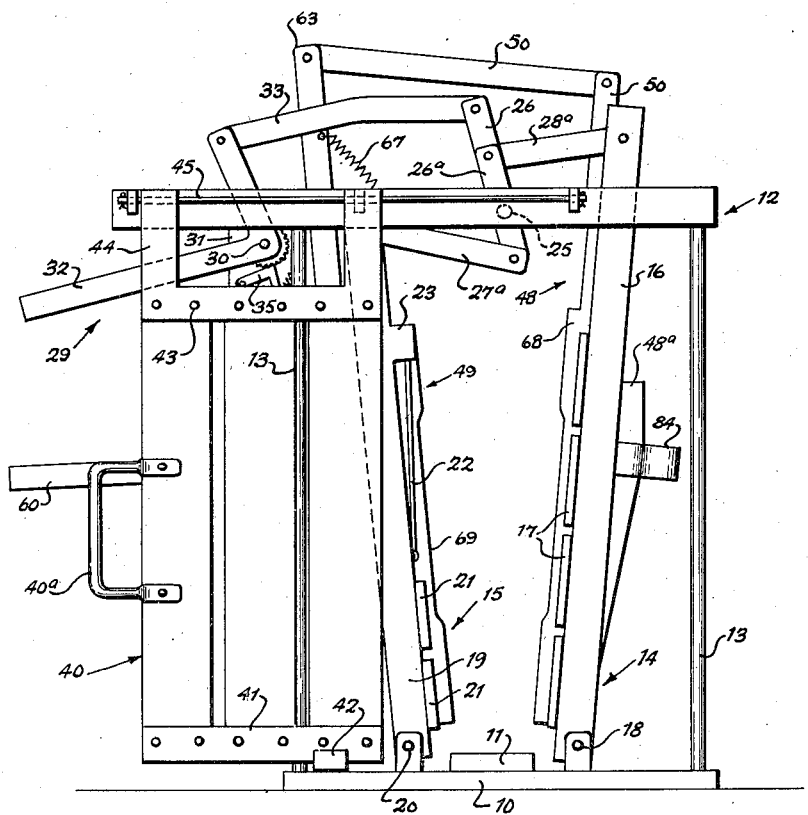
Figure 6 is an end elevation, this of what may be called the door-equipped entrance end, the slide door being shown open.

Referring now to the drawings by distinguishing reference numerals and glancing at the end view in Figure 6, the transverse section in Figure 8, and the top plan view in Figure 4, it will be seen that the main so-called openwork framework comprises a suitable wooden or equivalent base frame 10 having a longitudinal, centrally arranged plank 11 which defines the walkway of the stall to be hereinafter described. Superposed above the frame 10 is an angle iron frame 12 at the top, and this is joined to the bottom frame by corner posts or pipes 13.

Figure 1:
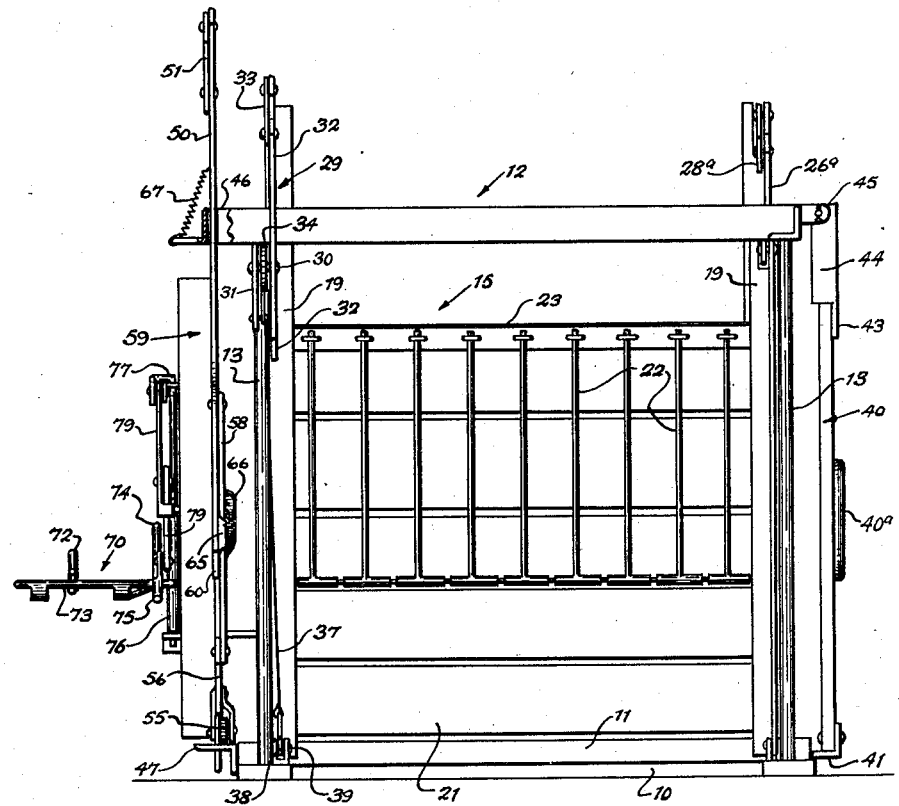
Figure 1 is a side elevational view, this observing one side of the cattle-confining and handling chute as constructed in accordance with the principles of the present invention.

The aforementioned expansible and contractible cattle stall, the major part of the chute, embodies (see Fig. 8) a pair of barrier and confining walls 14 and 15, respectively. The wall 14 at the right in Figure 8 is made up primarily of vertical angle irons 16 having horizontal, spaced parallel boards 17 secured thereto. The angle irons are hingedly mounted at their lower ends in brackets 18 to provide the desired swinging movement. Basically, the wall 15 is somewhat the same in that it comprises a pair of end angle irons 19 pivoted at their lower ends in brackets 20, these being provided with boards 21 adjacent their lower hinged ends. The upper half portion of this particular wall is made up of an openwork grille or grid composed of rods hinged at their lower ends and suitably latched closed at their upper ends on a horizontal angle iron 23 (see Figs. 1 and 8 in conjunction with each other). Thus, this wall is sufficiently open to permit access and inspection by the attendant. Also, it will be observed that each drop bar 22 works independently, thus making it possible for the attendant to expose any desired portion of the hide of the entrapped animal to a branding iron or the like. With the animal firmly held by the neck and with the "squeeze" applied, as many bars as required can thereafter be lowered or swung down without danger of the animal escaping from the pen. By arranging these walls 14 and 15 in opposed relationship and hinging same on opposite longitudinal edges of the plank 11, I thus provide the adjustable or expansible and contractible stall for not only enclosing and confining the cow or calf, as the case may be, but for putting same under restraining or clamping pressures from opposite sides. It is advisable, therefore, to describe the mechanical linkage means or expedients for both moving the walls toward and from each other and clamping same in set restraining positions.

Figure 4:
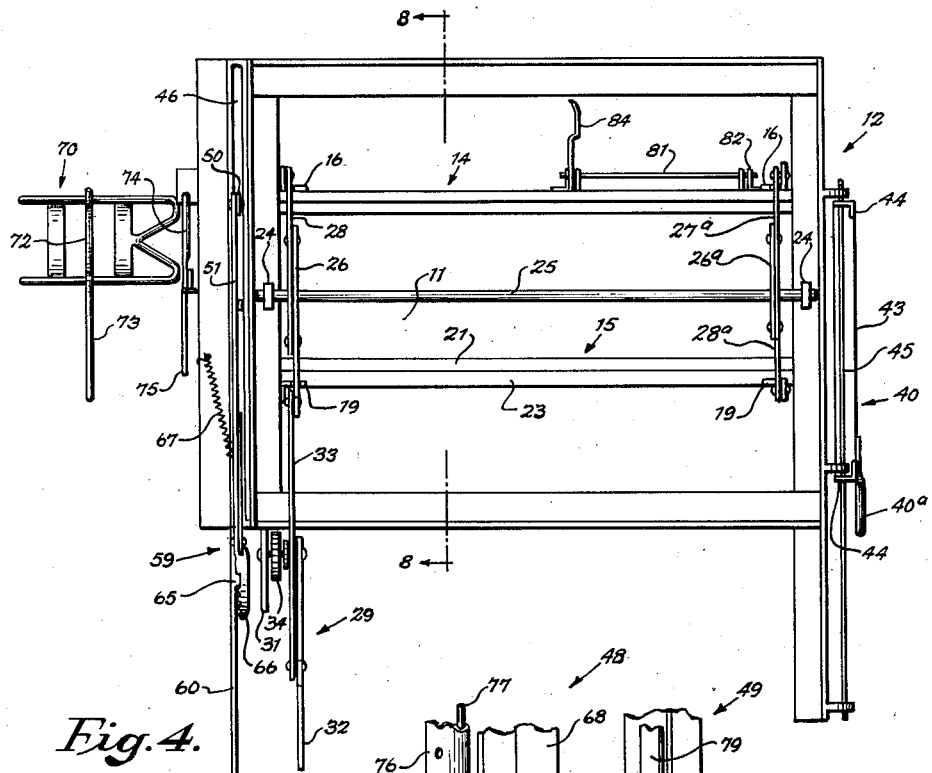
Figure 4 is a top plan view.

To begin with, I would direct attention to Figure 4 in which numerals 24 designate bearings in which a horizontal rocker shaft 25 has its ends mounted for oscillation. At the hand-controlled operating end (see front end in Fig. 8) I provide a fixedly attached rocker arm 26 having, at its lower end, pivoted link connection at 27, with the upper end portion of the confining and squeeze wall 15. The intermediate half-portion of the rocker arm 26, at a point above the rocker shaft 25, is provided with a lateral link 28 affording a suitable toggle connection with the wall 14. Thus, the oscillation of the shaft and rocker arm produces a toggle effect which opens and closes the walls 14 and 15 in relation to the animal on the platform 11 therebetween. I next call attention to a bell-crank 29 which forms an L-shaped lever, this pivoted, as at 30, on an outstanding adapter plate 31 on the upper forward end portion of the frame structure. The end portion 32 provides a conveniently projecting handle. The opposite end portion is connected by a push-pull link 33 with the rocker arm 26. The pivot 30 (see Fig. 8) is provided with a ratchet wheel 34 controlled by a pawl 35 pivoted on the plate 31, the pawl being sustained in engagement with the ratchet wheel by a coiled lifting spring 36 appropriately arranged and anchored. The pawl 35 is controlled by a cable 37 which in turn is operated by a foot pedal 38 on the lower part of the frame structure, as indicated at 39. This pedal, pawl and ratchet and lever-controlled linkage mechanism is at the stanchion or front end of the structure and the foot pedal is directly under the handle 32. At the opposite or rear end is a companion toggle arrangement which operates under the influence of the toggle means already described. The second toggle means comprises a rocker arm 26a fixed on the rear end of the rocker shaft 25, a link 27a connected thereto and to the wall 15, and a complemental link 28a connected to the remaining wall 14 (see Figure 6). It will be thus understood that when released by the pedal-controlled pawl and ratchet means, the L-shaped lever 29, through the medium of the push-pull link 33, serves, when moved by hand, to actuate the toggle devices on opposite ends of the rocker shaft, whereby to hinge and swing the two confining walls 14 and 15 toward and from each other. It is possible to thus open and close the walls, as it were, and to put sufficient pressure on opposite sides of the animal to confine him substantially immovably while safely performing certain and predetermined operations.

Attention is now directed to the entrance end of the structure. Reference is had, therefore, to Figure 6, wherein it will be observed that a vertical door 40 made up of vertical wooden planks, or the like, is provided. This has a handle 40a and reinforcing runner 41 at its bottom riding in a suitable guide 42 on the base. A U-shaped part comprising a yoke 43 is attached to the upper end of the door and the yoke arms 44 are slidably mounted on a horizontal track and hanger rod 45. It follows that after the calf or cow is driven through the rear end and into the stall, the door 40 is closed to prevent escape through this end of said stall.

I next call attention to the front or stanchion-equipped end of the chute. At this end (see Figs. 4 and 7 for example), the upper part of the frame is provided with a slotted portion which forms a horizontal guideway 46. The basal part of the framework is provided with an angle iron whose horizontal flange defines a ledge 47. This is in effect a track which serves in a manner to be hereinafter described. One of the stanchions, the one at the left, is denoted by the numeral 48, and the other one by the numeral 49. The stanchion 48 has an extension 50 which extends up through the guide slot 46 where it is connected to an associated link 51. The lower end of the stanchion 48 is anchored on the angle iron 47. The flange of this angle iron is slotted and the corresponding lower end 52 of the other stanchion is slidable in the slot. The upper end 53 (see Fig. 7) is also slidable in the guideway 46. A laterally projecting, substantially horizontal arm 54 is connected to the lower end portion 52, and at this point I also provide (see Fig. 1) a bracket carrying an anti-friction roller 55 which rides back and forth on the track flange 47.

Figure 7:
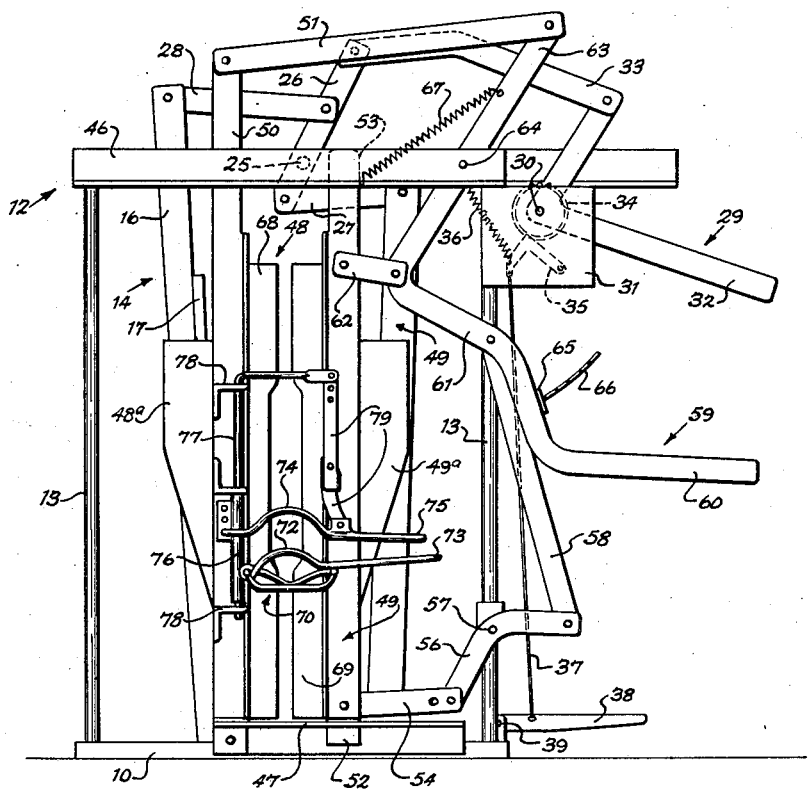
Figure 7 is likewise an end elevational view of the opposite end, that is, the end opposite to that seen in Figure 6, said view bringing out the particular construction of the parts at the dehorning stanchion-equipped end.

While considering Figure 7, I direct attention to a bell-crank 56 pivotally mounted on the adjacent upright 13, as indicated at 57. This bell-crank is connected to the arm 54 and an actuator link 58. The latter is connected at its upper end to the substantially U-shaped hand-operated lever 59. One end of this, as indicated at 60, projects and provides a suitable handle. The intermediate or bight portion 61 is pivotally connected to the link 58. The bight portion is also connected by a short push-pull link 62 to the upper part of the right hand stanchion 49. The remaining limb or portion 63 is pivotally anchored, as at 64, on the stationary frame structure. This end 63 is also connected to the aforementioned tie link 51 between the stanchion extension 50 and said lever 59. The bight portion 61 is provided with a detent or tooth 65 engageable with rack teeth on an arcuate fixedly mounted retaining rack 66. Thus, the swinging movement of the handle-equipped lever 59 is controlled in its in-and-out motions. To facilitate the operation of this mechanism, I provide a coiled spring 67 which is anchored on the frame structure and also attached at one end to the end portion 63 of the lever 59.

Figure 5:
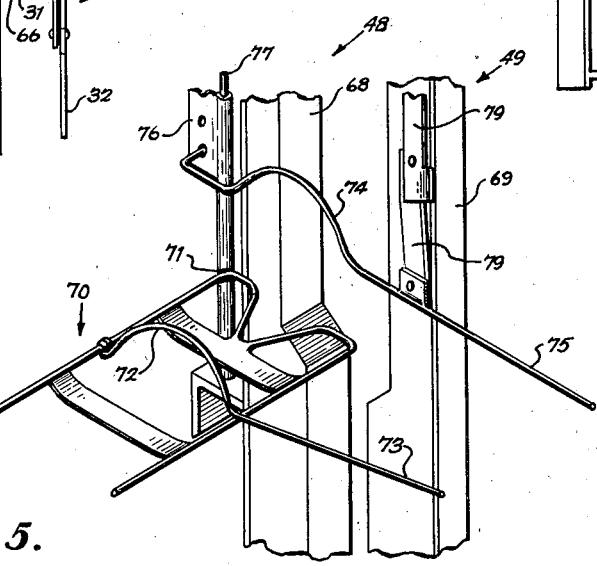
Figure 5 is a fragmentary perspective view, this on a slightly enlarged scale, to bring out the shape of the stiles of the stanchions and the head and nose-shackling appliances.

As shown in Figure 5, the stiles, these being preferably of wood, are denoted by the numerals 68 and 69, and these have portions notched and thus shaped to "collar" and embrace the opposite sides only of the protruding neck of the cow.

Attention is also directed to the shackle and head and nose fettering means which projects outwardly beyond the adjustable stanchion 48, this in alignment with the head opening in said stanchions. This comprises a suitable adapter 70 which is anchored at 71 and which extends horizontally. This serves to support the mouth and throat of the animal and is shaped to conform thereto. An appropriately shaped nose guard 72 is provided, this having a suitable handle 73. A similar arcuately curved head and neck guard is indicated at 74, and this is provided with a handle 75, one end of the structure being pivoted in a slide 76 on a vertical rod 77 of the L-shaped holder, as seen to advantage in Figure 7. As shown here, this holder is mounted in suitable brackets 78 and is provided with coacting links 79 which connect with the intermediate portion of the handle 75. When the pivoted ends of the links pass dead center they lock and this in turn locks the neck bridge 74 in place. It follows that the animal's head is saddled in the framework 70 and is held therein by the coacting safety holders 72 and 74, respectively. This arrangement provides for convenient retention of the head of the animal while the attendant performs a dehorning operation.

It is evident that the means shown in Figures 5 and 7 is for accommodating and holding the head and neck of the animal substantially immovable to permit the attendant to safely perform a dehorning job. The stanchions at the same end assist in this operation as well as in the other holding operations in which the animal is penned in the adjustable stall. The up-and-down movement of the handle 60 of the lever 59 through the medium of the linkage devices shown serves to adjust the stanchions toward and from each other making it possible to open the stanchions to permit the animal to readily protrude the head and neck therethrough. Then the stanchions are brought together by the same lever and linkage means and are closed and held closed. The retaining elements 65 and 66 serve to hold the lever 59 in closed as well as partly open positions.

Attention comes now to the milking door 80 which is arranged in an access or manhole in one side of the stall wall 14. This door is of any suitable construction and is hingedly mounted, as at 81, in appropriate angle irons 82. The numeral 83 designates a simple hand-controlled latch which keeps the door closed under normal circumstances. When the milking step is desired, the latch is released and the door is swung out and up, as shown in the positions illustrated in Figure 3. In its "up" position it is held by a retaining or keeper clip 84. It is obvious that this is not meant for ordinary daily dairy milking, but for range cows that have to be milked to relieve an overloaded bag. As these cattle are usually wild, the milking access means comes in handy and avoids otherwise crippling results.

Regardless of the type of cattle work to be performed, a chute characterized by the structure herein shown and described will facilitate cattle-handling, this with ease and expediency. It will enable a single attendant, in most circumstances, to do the entire work assignment of vaccinating, dehorning, branding, or whatever is called for. Ordinarily, in handling range cattle, due to ferocious reactions when captured, it is believed that safe and sane accomplishments are virtually assured.

The chute shown and described was designed and built by me for the specific purpose of adequately holding cattle, regardless of size or temperament. With this end in view, no effort was spared to make this chute a useful, trouble-free piece of equipment that would be a valuable extra hand in any cattle raising enterprise.

The framework is sturdily constructed of 3¼ inch steel tubing electrically welded to a 6 inch channel iron base. The drop bars 22 are of 2 inch steel tubing and hinge on a 1½ inch steel bar. In each phase of construction, stress is placed on strength and durability. Weighing 1,300 pounds and with all joints securely arc welded, the need for anchoring the structure to the ground is eliminated. With nothing to break, bend or wear out, my improved chute is built to last a lifetime.

Plenty of room is available for even the largest animal to walk through without rubbing or crowding. The chute is 5 feet wide by 6 feet long, allowing ample space to pen an animal by leaving the front end closed and shutting the sliding door 40 in the rear. Using my chute and method, a twelve-year-old girl has easily caught and held a wild range cow—not once by accident—but repeatedly under various conditions.

Three hundred pounds of calf or a ton of bull—the squeeze action of my cattle chute is smooth and positive—requires no adjustment. Both side walls close simultaneously and automatically lock wherever stopped. A convenient foot pedal relieves the squeeze, leaving both hands free to operate the release mechanism.

A supplemental side wall panel is available for branding, dehorning, vaccinating and castrating young calves. This detachable calf panel provides a humane substitute for the old drudgery of roping, throwing and stretching young stock in a dirty corral.

For dehorning, tattooing, horn branding, mouthing and doctoring, a sliding headpiece is included that holds the animal's head firmly and securely without choking. Although the head is held so that any movement is impossible, breathing is never interfered with by the improved headpiece of this cattle chute. The headpiece is readily detachable when not needed.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. In a cattle-holding and restraining enclosure of the class described, a frame-work comprising a horizontal base frame, a rectangular horizontal top frame, vertical corner posts connecting said frames in superposed vertically spaced relation, a longitudinal plank supported on the base frame and forming a stall platform, a horizontal rocker shaft commensurate in length with and mounted for oscillation in bearings in the top frame, upstanding, opposed, hingedly mounted stall walls mounted on said base frame and located along opposite longitudinal sides of said platform, operating connections between the opposite end portions of the rocker shaft and the upper end portions of said walls, stanchions independently and operatively mounted on the framework at one end of said stall, means for moving the stanchions toward and from each other, and a slidable captive confining door operatively mounted on said framework at the opposite end of the stall.

2. In a cattle chute of the class described, a relatively stationary framework comprising a horizontal base frame, a horizontal top frame, perpendicular corner posts connecting said frames in superposed vertically spaced relationship, a horizontal longitudinally extending plank mounted on the base frame, confining walls hingedly mounted on opposite longitudinal sides of said plank, a hanger and tracking rod secured on one end of the top frame, a rear trapdoor vertically disposed and provided with means slidably mounted on said hanger rod, said trapdoor being adapted to close one end of the stall formed by said pivoted stall walls, stanchions at the opposite end of the stall, said stanchions being conjointly mounted on corresponding end portions of said top and base frames, the latter frame being provided with a fixed track-forming flange, one of the stanchions being slidably connected thereto, the other stanchion being pivotally connected to said flange, the first-named stanchion being bodily movable toward and from the second-named stanchion, said top frame being provided with horizontal guide means, said stanchions having vertical extensions conjoined and slidable in said guide means, a substantially U-shaped lever having one end portion pivoted on the top frame, a link pivotally connected with one end of the lever and the upper end of one of the extensions on one of the stanchions, and a toggle link connection between the intermediate portion of said U-shaped lever and the lower portion of the remaining stanchion.

3. In a cattle chute of the class described, a relatively stationary framework of open side and end construction comprising a horizontal base frame, a horizontal top frame, perpendicular corner posts connecting said frames in superposed vertically spaced relationship, a horizontal longitudinally and centrally positioned plank mounted on the base frame, captive confining walls hingedly mounted within the confines of the framework and positioned on opposite longitudinal sides of said plank, a horizontal hanger and tracking rod secured on one end of the top frame, a trapdoor vertically disposed and provided with means slidably mounted on said hanger rod, said trapdoor, when closed being adapted to coact with the adjacent ends of the aforementioned walls in defining a captive stall, stanchions at the opposite end of said walls and completing said stall, said door and stanchions being located exteriorly of the framework, said stanchions being conjointly mounted on the adjacent end portions of said top and base frames, the latter frame being provided with a fixed outstanding track-forming flange, one of the stanchions being slidably connected to said flange, the other stanchion being pivotally connected to said flange, the first-named stanchion being bodily movable toward and from the second-named stanchion, said top frame being provided with horizontally disposed guide means, both of said stanchions having, at their upper ends, vertical extensions and said extensions being confined and slidable in said guide means, a substantially U-shaped lever having one end portion thereof pivoted intermediate its ends on said top frame, a pivoted link connection between the U-shaped lever and the adjacent stanchion, a second link connection between the U-shaped lever and the upper end of one of the extensions on one of said stanchions, one end of said U-shaped lever constituting a handle, and a toggle including links pivotally connected together, one of said links being pivotally connected to the intermediate portion of said U-shaped lever and the other link being pivotally and operatively connected with said slidable stanchion.

4. In a cattle-holding and restraining chute of the class described, an open style relatively stationary framework, a captive confining stall embodying opposed companion walls hingedly mounted for operation within the confines of said framework, stanchions at one end of the framework coacting with adjacent ends of the walls, a trapdoor on the opposite end and exteriorly of the framework and coacting with adjacent ends of said walls and completing said stall, means for swinging said walls toward and from each other, said means comprising a rocker shaft operatively mounted atop and centrally of said framework, rocker arms secured respectively on opposite end portions of said shaft within the confines of the adjacent portion of said framework, and toggle links pivotally connected with end portions of the rocker arms and operatively connected with adjacent portions of said walls.

5. In a cattle-holding and restraining chute of the class described, an open type relatively stationary framework, a captive confining stall embodying opposed companion walls hingedly mounted for operation within the confines of said framework, stanchions at one end of the framework coacting with adjacent ends of the walls, a trapdoor on the opposite end and exteriorly of the framework and coacting with adjacent ends of said walls and completing said stall, means for swinging said walls toward and from each other, said means comprising a rocker shaft operatively mounted atop and centrally of said framework, rocker arms secured respectively on opposite end portions of said shaft within the confines of the adjacent portion of said framework, toggle links pivotally connected with end portions of the rocker arms and operatively connected with adjacent portions of said walls, an L-shaped lever pivotally mounted on and exteriorly of an adjacent portion of the framework, and a link connection between said L-shaped lever and one of said rocker arms.

6. A cattle accommodating and retaining chute of the class described comprising a relatively stationary frame structure, an open ended adjustable stall on said structure, door closure means for one end of the stall mounted on said frame structure, and stanchions operatively mounted on the frame structure at the opposite end of said stall, said stanchions being provided with head accommodation and mechanical shackling and fettering means, said means embodying an outstanding horizontally disposed adapter frame to comfortably accommodate the head of the animal, a handle equipped nose guard pivotally mounted on and overlying said adapter frame, a neck guard swingably mounted above the adapter frame and in close proximity to said stanchions, and toggle links connected with said neck guard for retaining same in set position.

WILLIAM P. McDONOUGH.

REFERENCES CITED

The following references are of record in the file of this patent:

UNITED STATES PATENTS

| Number | Name | Date |
|---|---|---|
| 243,810 | Sparrow | July 5, 1881 |
| 434,309 | Welch | Aug. 12, 1890 |
| 619,688 | Linn | Feb. 14, 1899 |
| 658,128 | Smith | Sept. 18, 1900 |
| 812,391 | Auchley | Feb. 13, 1906 |
| 1,323,072 | Kuhlman | Nov. 25, 1919 |
| 1,449,428 | McGaffee | Mar. 27, 1923 |
| 1,449,502 | Diffendaffer | Mar. 27, 1923 |
| 2,084,255 | Johnson | June 15, 1937 |
| 2,139,710 | Yokum | Dec. 13, 1938 |
| 2,268,707 | Huckelbridge | Jan. 6, 1942 |
| 2,308,213 | Shearer | Jan. 12, 1943 |

FOREIGN PATENTS

| Number | Country | Date |
|---|---|---|
| 323,177 | Great Britain | Jan. 2, 1930 |